No. 857,796. PATENTED JUNE 25, 1907.
G. M. EWINS.
AUTOMOBILE TIRE.
APPLICATION FILED NOV. 5, 1906.
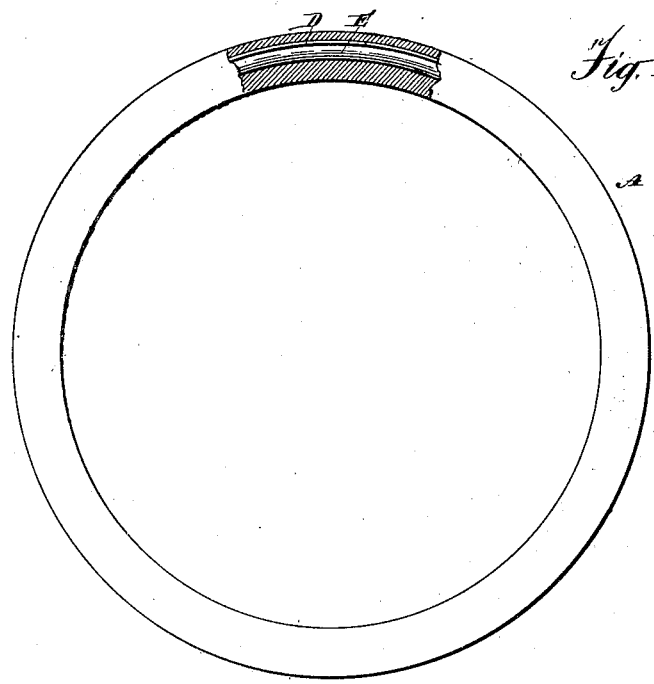
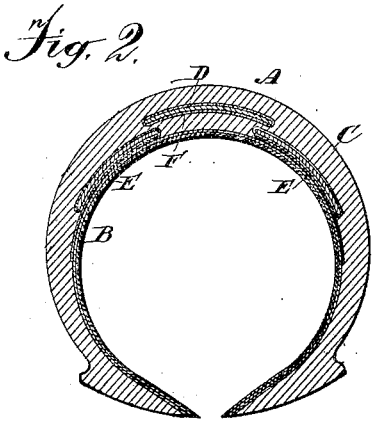
Witnesses.
E. J. Christie.
Edward J. Monahan.
Inventor
George M. Ewins
By J. M. St. John
Atty.

UNITED STATES PATENT OFFICE.

GEORGE M. EWINS, OF CEDAR RAPIDS, IOWA.

AUTOMOBILE-TIRE.

No. 857,796.   Specification of Letters Patent.   Patented June 25, 1907.

Application filed November 5, 1906. Serial No. 342,143.

*To all whom it may concern:*

Be it known that I, GEORGE M. EWINS, a citizen of the United States, residing at Cedar Rapids, in the county of Linn and State of Iowa, have invented certain new and useful Improvements in Automobile-Tires, of which the following is a specification.

The object of this invention is to produce a pneumatic tire, or tire case, so constructed as to prevent punctures, and at the same time having sufficient elasticity to serve for automobiles and other vehicles.

The nature of the invention will clearly appear from the description and claims following, reference being had to the accompanying drawings, in which—

Figure 1 is a side view of a tire embodying my invention—a part being broken away to show the puncture preventing metal bands embedded in the tire. Fig. 2 is a cross section of the same. Fig. 3 is a fragment of one of the steel bands wrapped spirally with canvas. Fig. 4 is a section of a band wrapped lengthwise with canvas.

The device is simple, and is described as follows:

A is a tire-case of a familiar type, having a canvas foundation B and the usual outer layer of rubber C. Around the tread portion of the tire, and embedded in the material thereof, are a number of continuous bands or hoops of elastic metal D and E, preferably of spring steel. These are made to conform approximately to the curvature of the tire, both transversely and circumferentially, and as shown in Fig. 2, are staggered with respect to each other, the middle one being preferably considerably larger than the other two, and set so that its edges overlap those of the smaller adjacent bands. This is of course done in the process of building up the tire, and is well calculated to prevent any puncture by nails or other sharp objects in its path. At the same time the construction admits of independent movement, within a limited range, of all parts of the tire, and without rubbing or abrading of surfaces, since the several bands are entirely out of contact with each other.

In practice the bands are wrapped with canvas F before embedding in the tire, and of course when the tire is vulcanized they become intimately, but flexibly, united with the body thereof, but the canvas protects their edges from cutting the rubber surrounding it. In the drawing I have shown a spiral wrap in Fig. 3, which might be sufficient for the larger outer band, and in Fig. 4 a longitudinal wrap with a projecting flap, which is preferred for the smaller bands, the flap being united with the foundation canvas, as shown in Fig. 2.

Having thus described my invention, what I claim as new, and desire to secure by Letters Patent, is:

A pneumatic tire or tire case, having embedded in the tread portion thereof a plurality of continuous elastic metal bands, conforming approximately in cross section to the curvature of the tire, separately wrapped with canvas intimately incorporated with the tire, the middle-outer band overlapping the side bands, the side-band wrappings having laterally extending flaps, substantially as described.

In testimony whereof I affix my signature in presence of two witnesses.

GEORGE M. EWINS.

Witnesses:
EDWARD J. MONAHAN,
J. M. ST. JOHN.